United States Patent [19]

Takeuchi et al.

[11] Patent Number: 5,111,717

[45] Date of Patent: May 12, 1992

[54] CLOSED LOOP DOWNSHIFT QUALITY CONTROL FOR AN AUTOMATIC TRANSMISSON

[75] Inventors: Jun Takeuchi, Zama; Takashi Shibayama, Isehara; Masahiro Iida, Yokohama, all of Japan

[73] Assignee: Nissan Motor Co., Ltd., Yokohama, Japan

[21] Appl. No.: 472,555

[22] Filed: Jan. 31, 1990

[30] Foreign Application Priority Data

Jan. 31, 1989 [JP] Japan .................................. 1-22295

[51] Int. Cl.$^5$ ............................................. B60K 41/06
[52] U.S. Cl. .............................................. 74/866; 74/867
[58] Field of Search ..................... 74/866; 192/109 F; 364/424.1

[56] References Cited

U.S. PATENT DOCUMENTS

| | | | |
|---|---|---|---|
| 4,289,221 | 9/1981 | Chambers et al. | 192/109 F X |
| 4,411,174 | 10/1983 | Yokoi et al. | 74/866 |
| 4,497,222 | 2/1985 | Nagaoka et al. | 74/866 |
| 4,527,678 | 7/1985 | Pierce et al. | 74/866 X |
| 4,653,351 | 3/1987 | Downs et al. | 74/866 |
| 4,685,356 | 8/1987 | Iwatsuki | 74/866 |
| 4,763,545 | 8/1988 | Shibayama et al. | 74/868 |
| 4,789,936 | 12/1988 | Kurihara et al. | 74/866 X |
| 4,793,216 | 12/1988 | Hiramatsu et al. | 74/866 |
| 4,796,490 | 1/1989 | Butts et al. | 74/866 |
| 4,800,497 | 1/1989 | Koori et al. | 74/866 X |
| 4,823,646 | 4/1989 | Yoshimura et al. | 74/866 |
| 4,838,126 | 6/1989 | Walfinger et al. | 74/866 X |
| 4,955,259 | 9/1990 | Narita | 74/866 |

FOREIGN PATENT DOCUMENTS 62-83539 4/1987 Japan .

*Primary Examiner*—Leslie A. Braun
*Assistant Examiner*—Matthew W. Stavish
*Attorney, Agent, or Firm*—Foley & Lardner

[57] ABSTRACT

A downshift quality control for a predetermined downshift involving engagement of a predetermined hydraulically operated friction element, i.e., a low clutch, is disclosed. A hydraulic fluid supply circuit communicates with the low clutch and includes a variable flow restrictor, i.e., an orifice and a timing valve. The timing valve is operated by a solenoid under control of a control unit. The control unit monitors a speed ratio of a revolution speed of an internal combustion engine to a revolution speed of an output member of an automatic transmission and energizes or deenergizes the solenoid to shift the timing valve to a position where a passage bypassing the orifice is opened.

10 Claims, 6 Drawing Sheets

CLOSED LOOP DOWNSHIFT QUALITY CONTROL FOR AN AUTOMATIC TRANSMISSON

BACKGROUND OF THE INVENTION

The present invention relates to a vehicle having a system for controlling a downshift in an automatic transmission, and more particularly to a vehicle having a system for controlling hydraulic fluid pressure supplied to a hydraulically operated friction element to be engaged for a downshift in an automatic transmission.

Most motor vehicles have an automatic transmission including a planetary gear train for engaging the different gears. To change gears, one of the different constituent units of the planetary gear set, for example, the sun or the ring or the planet carrier is braked separately with the help of hydraulically operated friction elements, for example, the clutches or the brakes.

To keep the hydraulically operated frictional elements engaged, the hydraulic fluid under the line pressure is used. The line pressure is variable with variation in the engine load or the throttle opening degree, such that the line pressure increases in response to an increase in the engine load to avoid occurrence of slip in the hydraulically operated friction element.

For a power-on downshift, i.e., a downshift with an accelerator pedal depressed, the hydraulic fluid with a relatively high line pressure is supplied to a hydraulically operated friction element to be newly engaged. Thus, if it is subject to this high line pressure at once, the hydraulically operated friction element will engage with substantially great shock, inducing a shift shock during the downshift.

To solve this problem, it is the usual practice to provide a variable flow restrictor disposed in a hydraulic fluid supply circuit for a low clutch to be newly engaged during a downshift. Reference should be made in this regard to a variable flow restrictor in a hydraulic fluid supply circuit for a low clutch in an automatic transmission disclosed U.S. Pat. No. 4,763,545 issued to Shibayama et al on Aug. 16, 1988 (corresponding to JP 62-83539 A). The variable flow restrictor in this known automatic transmission includes an orifice and a timing valve having a position where a bypass passage in parallel to the orifice is opened. The timing valve is operable by a solenoid under control of a control unit.

If supply of hydraulic fluid to the friction element is effected through this orifice from initiation of the downshift to completion thereof, it takes a long time from initiation of engagement of the low clutch to completion thereof. Thus, the shift quality is degraded owing to shift lag or engine racing. To avoid this problem, the solenoid shifts the timing valve to the position where the bypass passage is opened upon elapse of a predetermined time after initiation of the downshift, i.e., after detection of a command for the downshift. After the bypass passage is opened, the hydraulic fluid is supplied to the low clutch quickly, thus shortening the time required for the downshift.

According to this known shift quality control system, the length of time is not variable with a variation in the engine revolution speed immediately after the downshift has been initiated, so that it is difficult to maintain a good shift quality.

SUMMARY OF THE INVENTION

According to the present invention, in a vehicle having an internal combustion engine and an automatic transmission drivingly coupled with the internal combustion engine and having an output member, the automatic transmission including a predetermined hydraulically operated friction element which is engaged when the automatic transmission effects a predetermined downshift in gear, there is provided a shift quality control system during the predetermined downshift, comprising:

first sensor means for detecting a revolution speed of the internal combustion engine and generating an input revolution speed indicative signal indicative of said revolution speed of the internal combustion engine detected;

second sensor means for detecting a revolution speed of the output member of the automatic transmission and generating an output revolution speed indicative signal indicative of said revolution speed of the output member of the automatic transmission detected;

a hydraulic fluid circuit for the predetermined hydraulically operated friction element, said hydraulic fluid supply circuit including a variable flow restrictor for restricting flow of hydraulic fluid passing therethrough; and a control unit operatively connected with said first and second sensor means and with said variable flow restrictor, said control unit including means for determining a speed ratio of said input revolution speed indicative signal to said output revolution speed indicative signal and generating a speed ratio indicative signal indicative of said speed ratio determined, means for generating a reference speed ratio value indicative signal, and means for controlling said variable flow restrictor such that said variable flow restrictor restricts the flow of hydraulic fluid to a first degree when said speed ratio indicative signal fails to attain a predetermined relationship with said reference speed ratio value indicative signal, but when said speed ratio indicative signal attains said predetermined relationship with said reference speed ratio value indicative signal, said variable flow restrictor switches to restrict said the flow of hydraulic fluid to a second degree which is less than said first degree.

Accordingly an object of the present invention is to provide a closed loop shift quality control system for a downshift in an automatic transmission of a motor vehicle.

DETAILED DESCRIPTION OF THE INVENTION

Figure 1:
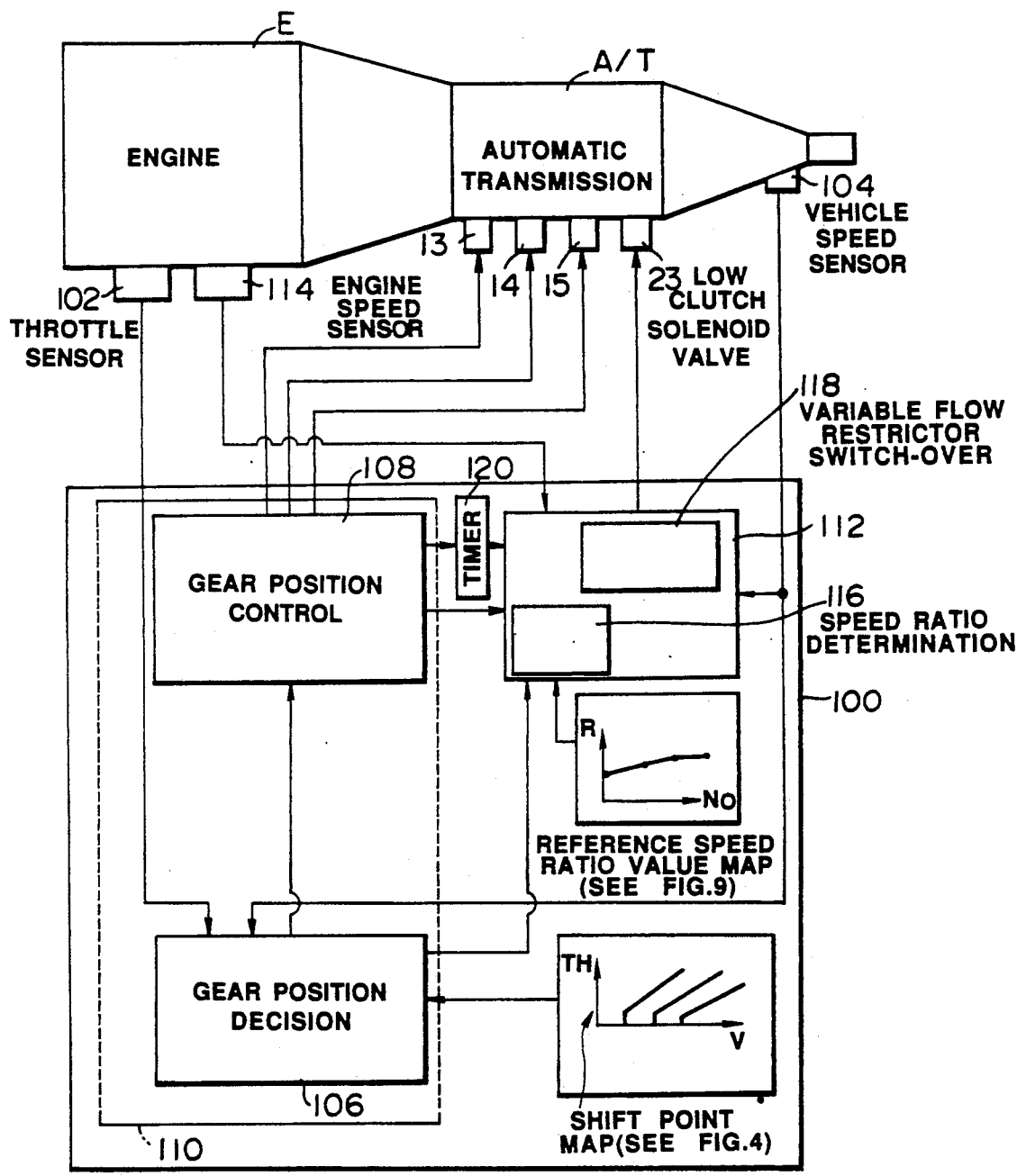
FIG. 1 is a block diagram of a drive system of a motor vehicle with a shift quality control system according to the present invention.

Referring to FIG. 1, there is shown an automatic transmission A/T drivingly coupled with an internal combustion engine E. The engine E has a throttle, not shown, which opens in degree. The automatic transmission shifts in gear under control of a control unit 100.

Figure 2:
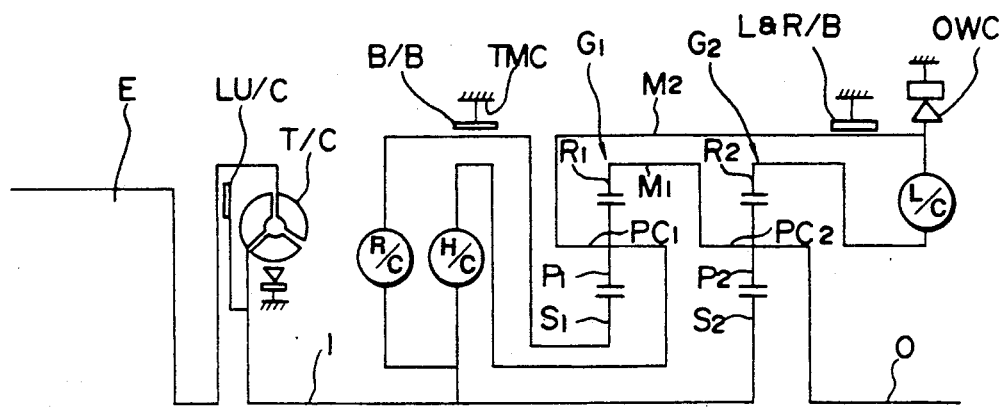
FIG. 2 is a diagram of a power train of an automatic transmission.

The above-mentioned automatic transmission A/T includes a power train as shown in FIG. 2, and it is drivingly coupled, via a hydraulic torque converter T/C, with the internal combustion engine E in a known manner. The hydraulic torque converter T/C includes a lock-up clutch LU/C. The automatic transmission A/T is drivingly coupled with driving wheels, not shown, of the vehicle in a known manner.

Referring to FIG. 2, the power train comprises an input shaft I, an output shaft O, a front planetary gear set $G_1$ which includes a front sun gear $S_1$, a front pinion gear $P_1$, a front ring gear $R_1$, and a front planet carrier $PC_1$. It also comprises a rear planetary gear set which includes a rear sun gear $S_2$, a rear pinion gear $P_2$, a rear ring gear $R_2$, and a rear planet carrier $PC_2$. The front and rear planetary gear sets $G_1$ and $G_2$ are arranged in tandem.

The power train also comprises hydraulically operated friction elements including a reverse clutch R/C, a high clutch H/C, a low clutch L/C, a low and reverse brake L&R/B, and a band brake B/B. It also comprises a one-way clutch OWC.

The reverse clutch R/C, when engaged, connects the input shaft I to the front sun gear $S_1$.

The high clutch H/C, when engaged, connects the input shaft I to the front planet carrier $PC_1$.

The low clutch L/C, when engaged, connects the front planet carrier $PC_1$ to the rear ring gear $R_2$.

The low and reverse brake L&R/B, when applied, holds the front planet carrier $PC_1$ stationary relative to the transmission case TMC.

The band brake B/B, when applied, holds the front sun gear $S_1$ stationary relative to the transmission case TMC.

The one-way clutch OWC prevents reverse rotation of the front planet carrier $PC_1$ although it allows forward rotation of same (i.e., the same rotational direction in which the engine rotates).

The following TABLE 1 shows the pattern in accordance of which the above mentioned friction elements are selectively put into operation.

TABLE 1

|  | R/C | H/C | L/C | B/B | L&R/B | OWC |
|---|---|---|---|---|---|---|
| Rev. | O |  |  |  | O |  |
| Fow. |  |  |  |  |  |  |
| 1st. |  |  | O |  |  | O |
| 2nd. |  |  | O | O |  |  |
| 3rd. |  | O | O |  |  |  |
| 4th. |  | O |  | O |  |  |

In the TABLE 1, the sign "o" indicates the state where the particular friction element is engaged or applied.

It is to be noted that the above-mentioned band brake B/B is activated by a band servo 17 (see FIG. 3) which has an apply chamber and a release chamber such that the band brake B/B is applied when the apply chamber is pressurized, while it is released when the release chamber is pressurized with the apply chamber kept pressurized.

Figure 3:
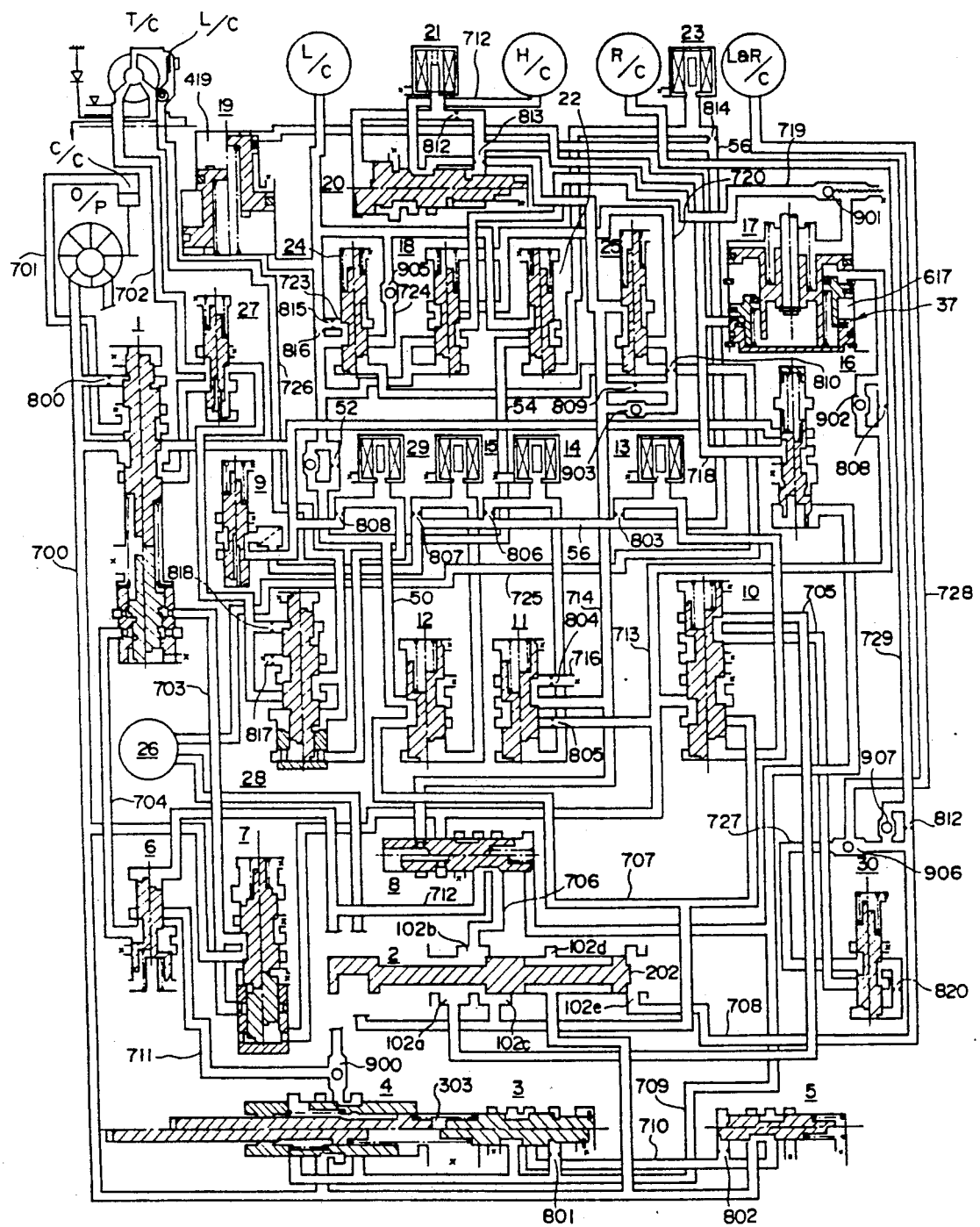
FIG. 3 is a hydraulic circuit of a hydraulic control system for the power train of the automatic transmission.

Referring to FIG. 3, the hydraulic control system is hereinafter described.

The hydraulic control system comprises an oil pump O/P, a pressure regulator valve 1, a throttle valve 3, a detent and fail-safe valve 4, a kickdown modulator valve 5, a pressure modifier valve 6, a cutback valve 7, a back-up valve 8, a pilot valve 9, a 1-2 shift valve 10, a 2-3 shift valve 11, a 3-4 shift valve 12, a 1-2 solenoid valve 13, a 2-3 solenoid valve 14, a 3-4 solenoid valve 15, an accumulator valve 16, a band servo 17, a servo release timing valve 18, a low clutch accumulator 19, a high clutch control valve 20, a high clutch solenoid valve 21, a low clutch timing valve 22, a low clutch solenoid valve 23, a 4-3 timing valve 24, a 3-2 timing valve 25, a governor valve 26, a torque converter regulator valve 27, a lock-up valve 28, a lock-up solenoid valve 29, and a I range reducing valve 30. These valves are circuited as illustrated.

The oil pump O/P is a variable volume type vane pump which has a hydraulic fluid pressure chamber C/C of a control cylinder connected to the hydraulic fluid passage 701 that serves as a feedback fluid pressure passage such that the pump discharge amount keeps a predetermined value at revolution speeds above a predetermined value.

The pressure regulator valve 1 is operable to adjust pressurized hydraulic fluid pressure discharged from the oil pump O/P to an appropriate pressure level for running state and speed ratio established in the transmission.

The manual valve 2 is operated by a select lever manipulated by a driver and selects port or ports to which line presure is to be distributed.

Manipulating the selector lever of the manual valve 2 causes a spool 202 to move between P range, R range, N range, D range, II range, and I range. Ports to be supplied with the line pressure are shown in the following TABLE 2.

TABLE 2

| RANGE | PORT | | | | |
|---|---|---|---|---|---|
|  | 102a | 102b | 102c | 102d | 102e |
| P |  |  |  |  |  |
| R |  |  |  | O | O |
| N |  |  |  | O |  |
| D |  |  | O | O |  |
| II |  | O | O | O |  |
| I | O | O | O | O |  |

In the TABLE 2, the port labelled with the sign "o" is supplied with the line pressure, whereas the port not labelled is drained.

The throttle valve 4 is operative to adjust the line pressure to a pressure variable corresponding to throttle opening degree (i.e., throttle pressure).

The detent and fail-safe valve 4 is operatively connected to an accelerator pedal linkage such that it applies a change in throttle opening degree to the throttle valve 3 via a spring 303. It has a detent function to supply throttle pressure to the pressure modifier valve 6, and a fail-safe function to supply line pressure to the pressure modifier valve 6 should if the accelerator linkage is broken to cause the pressure regulator valve 1 to produce the line pressure with the maximum value.

The kickdown modulator valve 5 is operative to generate a kickdown modulator pressure to be supplied to the throttle pressure 3 as a base pressure for generating throttle pressure.

The pressure modifier valve 6 is operative to generate a throttle modifier pressure to be supplied to the pressure regulator valve 1 as a signal pressure indicative of the variation characteristic of the engine torque.

The cutback valve 7 is operative to generate a cutback pressure to be supplied to the pressure regulator valve 1 so that the line pressure with the increased magnitude is produced during D range first gear position, II range first gear position, I range first gear position, R range, P range, and N range.

The backup valve 8 has a backup function to increase the magnitude of line pressure in order to increase the gripping force with which the band brake B/B is applied for producing increased effective engine brake running in the case where II range second gear position or I range second gear position is selected from D range third gear position or D range fourth gear position with the intention to effect engine brake running. It also has a function to release the backup function of increasing the magnitude of line pressure after the accelerator pedal has been depressed deeply during engine brake running.

The pilot valve 9 is operative to generate a pilot pressure which is supplied, as an actuating fluid pressure, to the 1-2 shift valve 10, 2-3 shift valve 11, 3-4 shift valve 12, low clutch timing valve 22 and high clutch control valve 20 although this pilot pressure may be modulated by the corresponding solenoid valves before being supplied to the valves.

The 1-2 shift valve 10, 2-3 shift valve 11 and 3-4 shift valve 12 are shiftable by the 1-2 shift solenoid valve 13, 2-3 shift solenoid valve 14 and 3-4 shift solenoid valve 15, respectively. Each of the shift solenoid valves 13, 14 and 15 is operable on an ON/OFF type control signal. The control signals supplied to the shift solenoid valves in each of the speed ratios are shown in the following TABLE 3.

TABLE 3

|      | 1-2 SOL. | 2-3 SOL. | 3-4 SOL. |
|------|----------|----------|----------|
| 1st. | ON       | ON       | ON       |
| 2nd. | OFF      | ON       | OFF      |
| 3rd. | OFF      | OFF      | OFF      |
| 4th. | OFF      | OFF      | ON       |

As will be understood from the TABLE 3, the third speed ratio is established if all of the shift solenoid valves are turned OFF due to the occurrence of a trouble in electrical connection in control system.

The accumulator valve 16 is operative on throttle pressure as a signal pressure to decrease the line pressure supplied to an accemulator chamber 617 of the band servo 17 in order to alleviate shift shock upon application of the band brake B/B. The reduced line pressure by the accumulator valve 16 is supplied also to an accmlator chamber 419 of the low clutch accumulator 19 in order to alleviate shift shocks upon engagement of the low clutch L/C.

The band servo 17, including a band servo accumulator 37, serves as a hydraulic actuator for applying or releasing the band brake B/B.

The servo release timing valve 18 is operative to connect the hydraulic fluid passage 719 connected to the servo release chamber of the band servo 17 to the hydraulic fluid passage 720 connected to the high clutch H/C or the hydraulic fluid passage connected to the low clutch L/C, selectively, in effecting upshift or downshift between the second gear position, third gear position, and fourth gear position.

The low clutch accumulator 19 is operative to moderate the rising of actuating fluid pressure supplied to the low clutch L/C in order to provide a smooth shift operation.

The high clutch control valve 20 is operative on an electrical control signal supplied to a high clutch solenoid valve 21 and controls the rising of actuating hydraulic fluid pressure supplied to the high clutch H/C, the pressure level of the actuating hydraulic fluid pressure, and the supply timing of the actuating hydraulic fluid pressure.

The high clutch solenoid valve 21 is operative on the control signal supplied thereto by the control unit 100.

The 3-2 timing valve 25 is operative to effect quick drainage of hydraulic fluid to decrease servo release pressure that serves as a band release pressure for the band servo 17 at low vehicle speeds in effecting a downshift from the third gear position to the second gear position, but it provides slow drainage of hydraulic fluid from the servo release chamber of the band servo 17 at high vehicle speeds.

The governor valve 26 is operative in response to rotation of the transmission output shaft to generate a governor pressure variable with the vehicle speed.

The torque converter regulator valve 27 is operative to prevent excessive increase of torque converter pressure supplied to the torque converter T/C.

The lock-up valve 28 is operative on an electrical control signal supplied to the lock-up solenoid valve 29 to control engagement or release of the lock-up clutch LU/C.

The lock-up solenoid valve 29 is operative on the control signal supplied thereto by the control unit not illustrated.

The I range reducing valve 30 is operative to reduce the actuating hydraulic fluid pressure supplied to the low and reverse brake L&R/B in order to alleviate engine brake shock in effecting a shift to I range.

The hydraulic fluid passages are labelled as follows:
700 . . . line pressure passage,
701 . . . feedback pressure passage,
702 . . . torque converter pressure passage,
703 . . . cutback pressure passage,
704 . . . throttle modifier pressure passage,
705 . . . I range pressure passage,
706 . . . II range pressure passage,
707 . . . D range pressure passage,
708 . . . R range pressure passage,
709 . . . throttle pressure passage,
710 . . . kickdown modulator pressure passage,
711 . . . throttle or line pressure passage,
712 . . . backup pressure passage,
713 . . . second, third, and fourth gear pressure passage,
714 . . . third and fourth gear pressure passage,
56 . . . pilot pressure passage,
716 . . . second gear drain passage,
717 . . . low clutch pressure passage,
718 . . . accumulator pressure passage,
719 . . . servo release pressure passage,
720 . . . third and fourth gear branch passage, 721 . . . high clutch pressure passage,
54 . . . low clutch pressure first bypass passage,
723 . . . low clutch pressure second bypass passage,
724 . . . low clutch pressure drain bypass passage,
725 . . . governor pressure passage,
726 . . . lock-up clutch pressure passage,
727 . . . low and reverse brake reduced pressure passage,
728 . . . low and reverse pressure passage,
729 . . . reverse clutch pressure passage, The reference numerals 800 to 821 designate orifices, respectively. The reference numerals 900 and 906 designate shuttle balls, respectively. The reference numerals 901 to 905 and 907 designate one-way balls, respectively.

Figure 4:
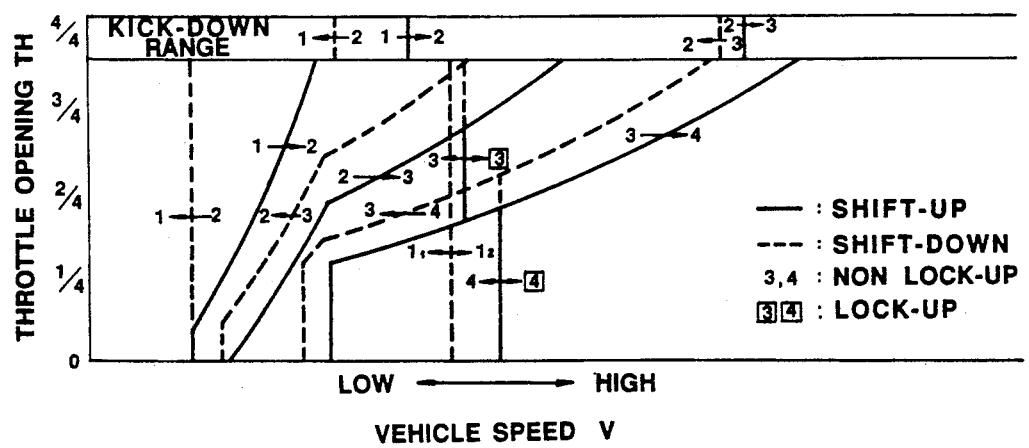
FIG. 4 is a graphical representation of a shift point mapping.

FIG. 4 shows a shift point mapping stored in the control unit 100. The map contains shift points versus different vehicle speed values V and different throttle opening degree values TH. The control unit 100 performs a table operation of the map shown in FIG. 4 to determine a gear to be engaged and set the 1-2, 2-3, and 3-4 shift solenoids 13, 14, and 15 in accordance with the TABLE 3 to establish the gear determined.

Figure 5:
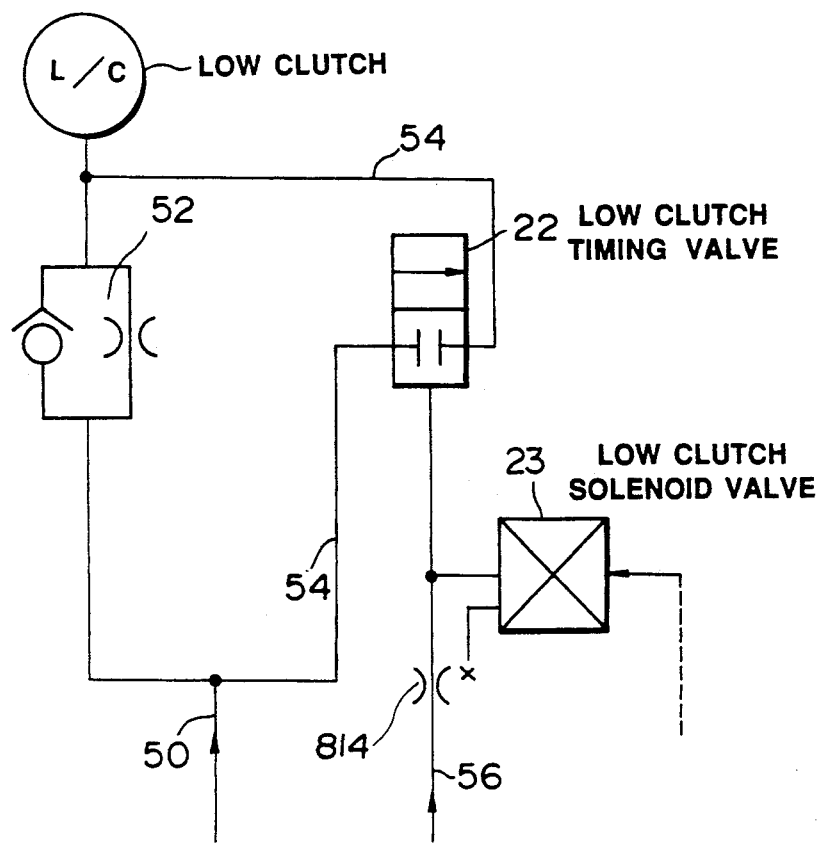
FIG. 5 is a schematic diagram of a hydraulic fluid supply circuit for a low clutch which is to be engaged during a predetermined downshift.

Referring back to TABLE 1, the band brake B/B is released and the low clutch L/C is engaged during a 4-3 downshift. FIG. 5 shows diagrammatically a hydraulic fluid circuit 50 for the low clutch L/C. The hydraulic fluid supply circuit 50 includes a one-way orifice 52 and a low clutch timing valve 22 which has a first position where it opens the passage 54 bypassing the one-way orifice 52 and a second position where it closes the bypassing passage 54.

The pilot pressure from the pilot pressure passage 56 is supplied to the low clutch or 4-3 timing valve 22 via the orifice 814 when the low clutch solenoid valve 23 is energized. Then, the low clutch timing valve 22 assumes the second position where the bypassing passage 54 is closed. When the low clutch solenoid valve 23 is deenergized, the hydraulic fluid is discharged from the low clutch timing valve 22. This causes the low clutch timing valve 22 to assume the first position where the bypassing passage 54 is opened. Thus, the bypassing passage 54 is closed when the low clutch solenoid valve 23 is energized, while it is opened when the low clutch solenoid valve 23 is deenergized.

From the description above, it will now be appreciated that the one-way orifice 52, low clutch timing valve 22, and low clutch solenoid valve 23 cooperate with each other to form a variable flow restrictor. The variable flow restrictor restricts flow of hydraulic fluid passing through the hydraulic fluid supply circuit 50 toward the low clutch L/U to a first or much degree in response to energization of the low clutch solenoid valve 23, while it switches to restrict the flow of hydraulic fluid to a second or less degree in response to deenergization of the low clutch solenoid valve 23.

Energization or deenergization of the low clutch solenoid valve 23 is controlled by the control unit 100.

Referring back to FIG. 1, the throttle opening degree indicative signal TH generated by the throttle sensor 102, the input revolution speed indicative signal $N_e$ generated by the engine speed sensor 114, the output revolution speed indicative signal $N_o$ generated by the vehicle speed sensor 104 are fed to the control unit 100.

The control unit 100 comprises a gear position decision block 106 where a table look-up operation of the shift point map shown in FIG. 4 is performed to determine a gear position to be established for the sensor signals generated by the throttle sensor 102 and vehicle speed sensor 104. In response to the gear position indicative signal generated by the gear position decision block 106, a gear position control block 108 generates output signals to the 1-2 solenoid valve 13, 2-3 solenoid valve, and 3-4 solenoid valve 15 to render them to assume predetermined ON/OFF states for the gear position determined at the gear position decision block 106 in accordance with the TABLE 3. The gear position decision block 106 and gear position control block 108 cooperate with each other to form a downshift detection block 110.

The control unit 100 also comprises a variable flow restrictor control block 112 for generating an output to the low clutch solenoid valve 23.

Supplied to the variable flow restrictor control block 112 are the input revolution speed (i.e., engine revolution speed) indicative signal $N_e$ generated by the engine speed sensor 114 and the output revolution speed indicative signal $N_o$ generated by the vehicle speed sensor 104, the gear position indicative signal generated by the gear position decision block 106, and a downshift signal generated by the gear position control block 108. The variable flow restrictor control block 112 comprises a speed ratio determination block 116 where a speed ratio R, i.e., a ratio of the input revolution speed ($N_e$) to the output revolution speed ($N_o$), is calculated, and it also comprises a variable flow restrictor switch-over block 118 where when the speed ratio R becomes greater than a reference speed ratio value $R_0$, the output signal supplied to the low clutch solenoid valve 23 is changed to cause the low clutch solenoid valve 23 to switch its state from energized state to deenergized state. At the variable flow restrictor switch-over block 118, a table look-up operation of the reference speed ratio value map shown in FIG. 6 is performed to determine the reference speed ratio value $R_0$.

Figure 6:
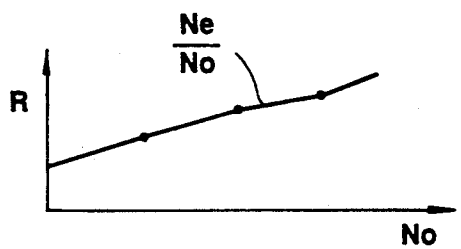
FIG. 6 is a graphical representation of speed ratio value mapping.

Referring to FIG. 6, the reference speed ratio value map contains various reference speed ratio values versus different output revolution speed ($N_o$) values.

As shown in FIG. 1, a timer 120 is operatively disposed in the control unit 100. The downshift signal generated by the gear position control block 108 is supplied to activate the timer 120. The timer 120 starts counting upon receiving the downshift signal. The number counted by the timer 120 is supplied to the variable flow restrictor control block 112.

When the number counted by the timer 120 reaches a predetermined length of time, the variable flow restrictor switch-over block 118 energizes the low clutch solenoid valve 23 to render the variable flow restrictor to switch to restrict the flow of hydraulic fluid to the second and less degree.

The predetermined length of time is emprically determined with due consideration of a time required for the speed ratio R to reach the reference speed ratio value $R_0$.

Figure 7:
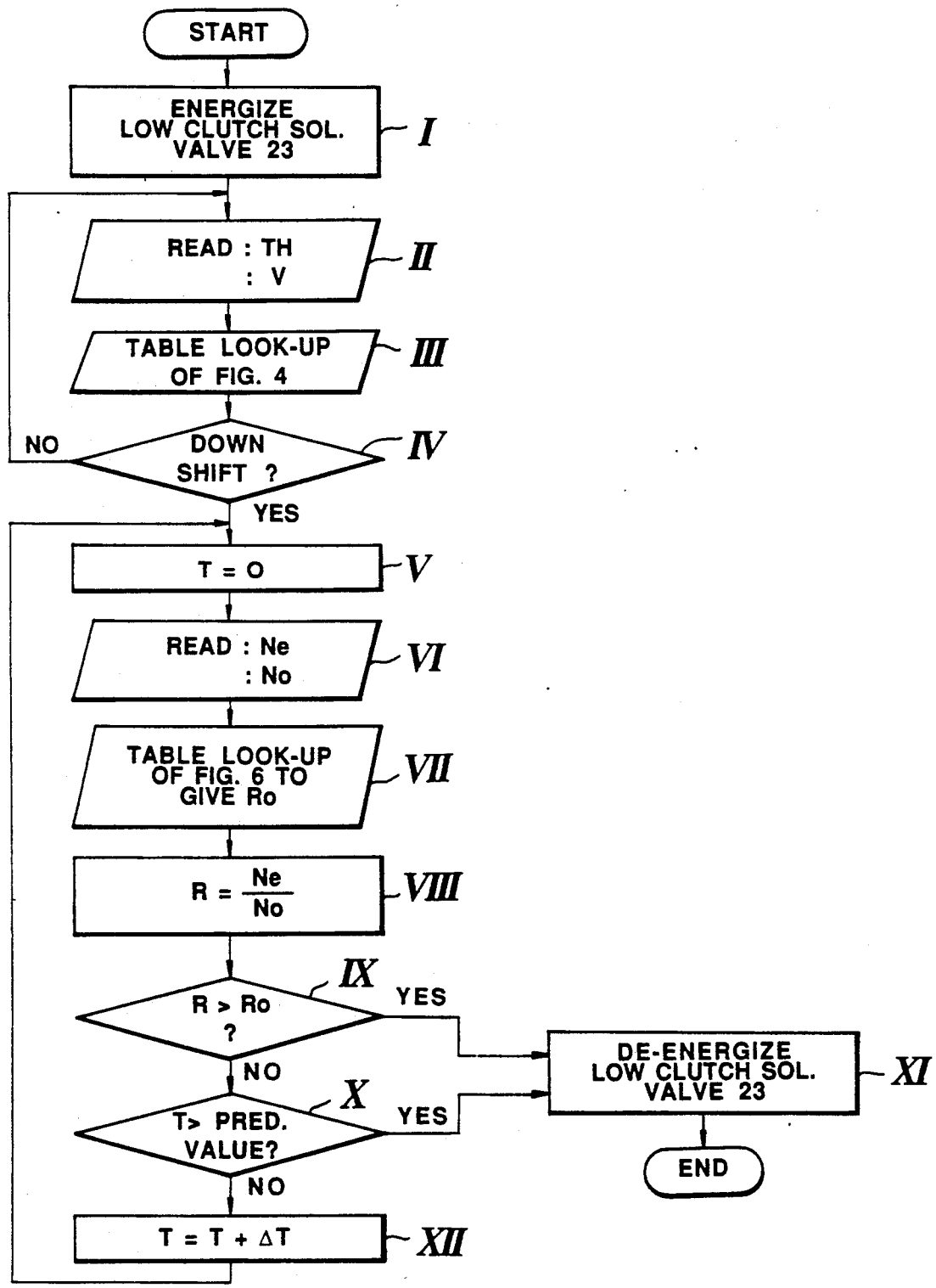
FIG. 7 is a flow diagram illustrating how a control unit operates to shift a timing control valve during a downshift involving engagement of a low clutch.

Referring to the flow diagram shown in FIG. 7, the operation of the control unit 100 is described in detail. The control unit 100 is a microcomputer controlled system including in the usual manner a central processor unit (CPU), a read only memory (ROM), a random access memory (RAM), and an input/output control unit (I/O). The ROM stores maps shown in FIGS. 4 and 6 and a program as illustrated in the flow diagram shown in FIG. 7.

In FIG. 7, at a step I an ON signal is supplied to the low clutch solenoid valve 23 to energize same, causing the lock-up clutch timing valve 22 to close the bypassing passage 54, thus rendering the variable flow restrictor (see FIG. 5) to restrict the flow of hydraulic fluid supplied to the low clutch L/C to the first and much degree. Then, the program proceeds to a step II where reading operations of the sensor output signals of the throttle sensor 102 and vehicle speed sensor 104 are performed to store the results as throttle opening degree TH and vehicle speed V, respectively. At the next step III, a table look-up operation of the shift point map shown in FIG. 4 is performed using the stored data TH and V to determine a gear position. Then, the program proceeds to a decision step IV where it is determined whether or not a 4-3 downshift is demanded by comparing the gear position stored in the present run with the previously stored gear position in the preceding run. When the 4-3 downshift is not demanded, the program proceeds back to the step II. When it is determined that the 4-3 downshift is demanded, the program proceeds to a step V where a timer T is reset to zero. Then, reading operations of the sensor outputs of the engine speed sensor 114 and vehicle speed sensor 104 are performed to store the results as input revolution speed $N_e$ and output revolution speed $N_o$, respectively. At the next step VII, a table look-up operation of the reference speed ratio value map shown in FIG. 6 is performed using the stored data $N_e$ and $N_o$ to store the result as reference speed ratio value $R_0$. Following this step, the program proceeds to a step VIII where a calculation of the equation $R = N_e/N_o$ is performed to store the result as speed ratio R. At a decision step IX, it is determined whether the speed ratio R is greater than the reference speed ratio value $R_0$ or not. When the speed ratio R still fails to be greater than the reference speed ratio value $R_0$ and thus the answer to the inquiry at the step IX is "NO", the program proceeds to a step X where it is determined whether the timer T is greater than a predetermined value or not. When the answer to the inquiry at the step IX is "YES", the program proceeds to a step XI where ON signal is supplied to the low clutch solenoid valve 23 to deenergize same, causing the low clutch timing valve 22 to open the bypassing passage 54, thus rendering the variable flow restrictor to restrict the flow of hydraulic fluid to the second and less degree. When the answer to the inquiry at the step X is "YES", the program proceeds to the above-mentioned step XI. When the answer to the inquiry at the step X is "NO", the program proceeds to a step XII where increment of the timer T by delta T is performed. Then, the program returns to the step V.

From the preceding description, it will now be appreciated that during the 4-3 downshift where the band brake B/B is released and then the low clutch L/C is engaged, the variable flow restrictor (52, 22, 54, 23) switches to restrict the flow of hydraulic fluid supplied to the low clutch L/C to the second or less degree at a timing when the speed ratio R becomes greater than the reference speed ratio value $R_0$. Thus, the pressure build-up at the low clutch L/C can follow variation in actual engine operating condition.

Figure 8:
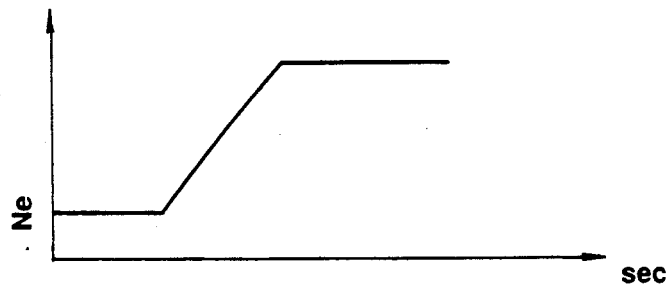
FIGS. 8(a) to 8(e) illustrate how various variables vary during the downshift according to the downshift quality control system.
Figure 8:
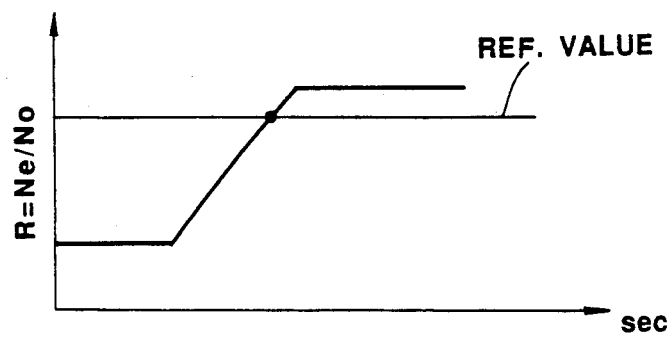
Figure 8:
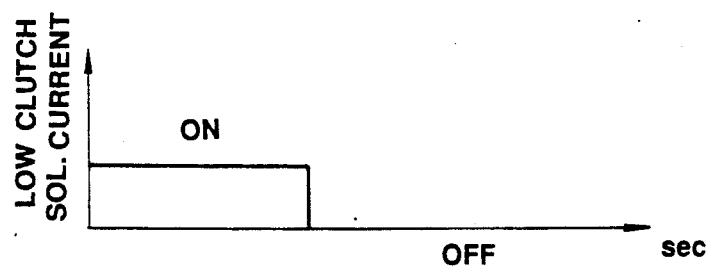
Figure 8:
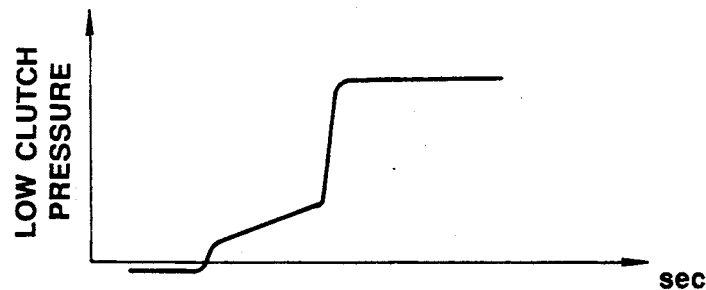
Figure 8:
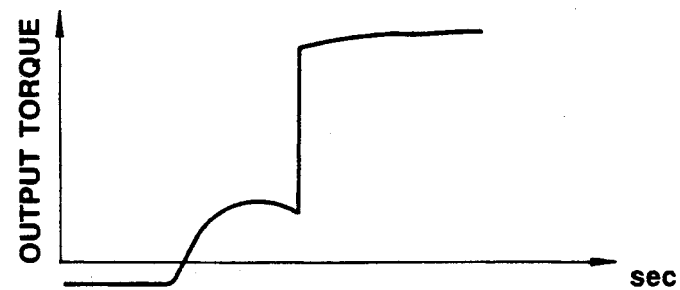

Describing further in connection with the time charts shown in FIGS. 8(a) to 8(e), FIG. 8(a) illustrates a variation in engine revolution speed ($N_e$) during a power-on 4-3 downshift under control of the control unit 100. FIG. 8(b) illustrates variation in speed ratio R and a moment when the speed ratio R becomes greater than the reference value $R_0$. At this moment, the signal supplied to the low clutch solenoid 23 switches from ON level to OFF level as illustrated in FIG. 8(c), and the low clutch pressure, i.e., pressure build-up at the low clutch L/C, increases quickly, as shown in FIG. 8(d), immediately after the moment when the predetermined relationship $R > R_0$ has been attained, see FIG. 8(b). In this manner, the low clutch L/C is brought into firm engagement quickly, so that the engine is prevented from racing. This results in a favourable pattern of variation in transmission output torque as illustrated in FIG. 8(e).

The embodiment thus far described uses the timer (120, T) to render the variable flow restrictor (52, 22, 23, 54) to switch to allow quick pressure build-up at the low clutch L/C upon elapse of the predetermined length of time after the 4-3 downshift command signal has been generated, thus providing a safeguard against a degraded shift quality which would occur should if the engine speed sensor 114 and vehicle speed sensor 104 fail to function properly.

Figure 9:
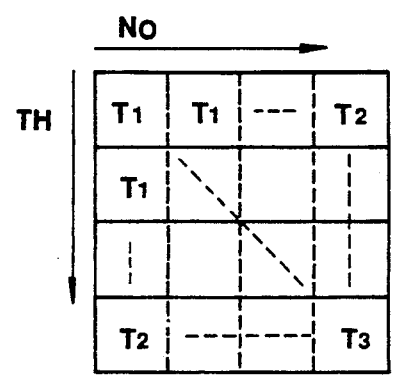
FIG. 9 is a table illustrating a predetermined time value mapping.

Preferably, the optimum values in the predetermined length of time are mapped versus different values of output revolution speed $N_o$ and different values of throttle opening degree TH as illustrated in FIG. 9. In FIG. 9, the relationship that $T_1 > T_2 > T_3 >$ holds. Using the stored TH and $N_o$, a table look-up operation of the map shown in FIG. 9 is performed to store the result as the predetermined length of time $T_0$. Then, the content of the timer T is compared with the content of $T_0$, and the variable flow restrictor (52, 22, 23, 54) switches to allow quick pressure build-up at the low clutch L/C at the moment when $T > T_0$ is attained.

According to the embodiment, the reference speed ratio value map as shown in FIG. 6 is used in determining the moment when the variable flow restrictor (52, 22, 23, 54) switches to allow quick pressure build-up at the low clutch L/C. This results in quick response and simplification of electric circuit.

According to the embodiment, the closed loop control of the engine revolution speed is employed in determining the moment when the variable flow restrictor (52, 22, 23, 54) switches to allow quick pressure build-up at the low clutch L/C. Thus, the low clutch L/C is engaged in such a good timing that the engine revolution speed is brought into a synchronized relationship with the transmission output revolution speed. Besides, the timing at which the variable flow restrictor (52, 22, 23, 54) is allowed to switch is varied in accordance with variation in engine revolution speed. As a result, a good shift quality is maintained even if such variation in engine revolution speed occurs during the downshift.

The present invention is applied to the 4-3 downshift in the preceding embodiment. However, the present invention may be embodied during a 3-2 downshift where the release chamber of the band servo 17 for the band brake B/B is discharged to engage the band brake B/B by restricting the flow of hydraulic fluid discharged from the release chamber of the band servo 17 by the variable flow restrictor.

What is claimed is:
1. A vehicle comprising:
an internal combustion engine;
a torque converter;
an automatic transmission drivingly coupled through said torque converter with said internal combustion engine and having an output member, said automatic transmission including a predetermined hydraulically operated friction element which is engaged when said automatic transmission effects a predetermined downshift in gear;

first sensor means located before the torque converter, for detecting a revolution speed of said internal combustion engine and generating an input revolution speed indicative signal indicative of said revolution speed of said internal combustion engine detected;

second sensor means for detecting a revolution speed of said output member of said automatic transmission and generating an output revolution speed indicative signal indicative of said revolution speed of said output member of said automatic transmission detected;

a hydraulic fluid circuit for said predetermined hydraulically operated friction element, said hydraulic fluid circuit including a variable flow restrictor for restricting flow of hydraulic fluid passing therethrough; and a control unit operatively connected with said first and second sensor means and with said variable flow restrictor, said control unit including means for determining a speed ratio of said input revolution speed indicative signal to said output revolution speed indicative signal and generating a speed ratio indicative signal indicative of said speed ratio determined, means for generating a reference speed ratio value indicative signal, and means for controlling said variable flow restrictor such that said variable flow restrictor restricts the flow of hydraulic fluid to a first degree when said speed ratio indicative signal fails to attain a predetermined relationship with said reference speed ratio value indicative signal, but when said speed ratio indicative signal attains said predetermined relationship with said reference speed ratio value indicative signal, said variable flow restrictor switches to restrict the flow of hydraulic fluid to a second degree which is less than said first degree.

2. A vehicle as claimed in claim 1, wherein said predetermined relationship is attained when said speed ratio indicative signal is greater than said reference speed ratio value indicative signal.

3. A vehicle as claimed in claim 1, wherein said reference speed ratio value indicative signal generating means include a map containing various reference speed ratio values versus different revolution speed values of the output member of the automatic transmission.

4. A vehicle as claimed in claim 3, wherein said reference speed ratio value indicative signal generating means include means for performing a table look-up operation of said map and generating the result as said reference speed ratio value indicative signal.

5. A vehicle as claimed in claim 1, wherein said control unit includes means for counting time elapsed from an initiation of the predetermined downshift and generating a time indicative signal indicative of said time counted, means for generating a predetermined time value indicative signal, and means for forcing said variable flow restrictor to switch to restrict the flow of hydraulic to said second degree regardless of what said speed ratio indicative signal indicates when said time indicative signal reaches said predetermined time value indicative signal.

6. A vehicle as claimed in claim 5, wherein said predetermined time value indicative signal generating means include a second map containing various time values versus different throttle opening degree values of the engine throttle and different output revolution speed values.

7. A vehicle as claimed in claim 6, wherein said predetermined time value indicative signal generating means include means for performing a table look-up operation of said second map and generating the result as said predetermined time value indicative signal.

8. A vehicle comprising:

An internal combustion engine having a throttle which opens in degree;

a torque converter;

an automatic transmission drivingly coupled through said torque converter with said internal combustion engine and having an output member, said automatic transmission including a predetermined hydraulically operated friction element which is engaged when said automatic transmission effects a predetermined downshift in gear;

first sensor means located before the torque converter, for detecting a revolution speed of the internal combustion engine and generating an input revolution speed indicative signal indicative of said revolution speed of the internal combustion engine detected;

second sensor means for detecting a revolution speed of the output member of the automatic transmission and generating an output revolution speed indicative signal indicative of said revolution speed of the output member of the automatic transmission detected;

third sensor means for detecting a throttle opening degree of the throttle and generating a throttle opening degree indicative signal indicative of said throttle opening degree detected;

a hydraulic fluid supply circuit communicating with the predetermined hydraulically operated friction element, said hydraulic fluid supply circuit including a variable flow restrictor for restricting flow of hydraulic fluid supplied to the predetermined hydraulically operated friction element; and a control unit operatively connected with said first, second and third sensor means and with said variable flow restrictor, said control unit including means for determining a speed ratio of said input revolution speed indicative signal to said output revolution speed indicative signal and generating a speed ratio indicative signal indicative of said speed ratio determined, means for generating a reference speed ratio value indicative signal, and means for controlling said variable flow restrictor such that said variable flow restrictor restricts the flow of hydraulic fluid supplied to the predetermined hydraulically operated friction element to a first degree when said speed ratio indicative signal fails to attain a predetermined relationship with said reference speed ratio value indicative signal, but when said speed ratio indicative signal attains said predetermined relationship with said reference speed ratio value indicative signal, said variable flow restrictor switches to restrict said the flow of hydraulic fluid supplied to the predetermined hydraulically operated friction element to a second degree which is less than said first degree, said control unit including means for counting time elapsed from an initiation of the predetermined downshift and generating a time indicative signal indicative of said time counted, means for generating a predetermined time value indicative signal, and means for forcing said variable flow restrictor to switch to restrict the flow of hydraulic fluid supplied to the predetermined friction element to said second degree regardless of what said speed ratio indicative signal indicates when said time indicative signal reaches said predetermined time value indicative signal.

9. A vehicle as claimed in claim 8, wherein said predetermined time value indicative signal generating means include a second map containing various time values versus different throttle opening degree values of the throttle and different output revolution speed values, and means for performing a table look-up operation of said second map based on said throttle opening degree indicative signal and said output revolution speed indicative signal.

10. A vehicle as claimed in claim 9, wherein said variable flow restrictor includes an orifice, a valve having a first position where a hydraulic fluid passage bypassing said orifice is closed and a second position where said hydraulic fluid passage is opened, and solenoid operated means for shifting said valve between said first and second positions thereof under control of said control unit.

* * * * *